US008315967B2

(12) United States Patent
Proctor

(10) Patent No.: US 8,315,967 B2
(45) Date of Patent: Nov. 20, 2012

(54) SEQUENTIAL MODE IN A RETE RULE ENGINE

(75) Inventor: Mark Proctor, London (GB)

(73) Assignee: Red Hat, Inc., Raleigh, NC (US)

( * ) Notice: Subject to any disclaimer, the term of this patent is extended or adjusted under 35 U.S.C. 154(b) by 1481 days.

(21) Appl. No.: 11/897,564

(22) Filed: Aug. 31, 2007

(65) Prior Publication Data

US 2009/0063385 A1    Mar. 5, 2009

(51) Int. Cl.
*G06F 17/00*    (2006.01)
*G06N 5/02*    (2006.01)

(52) U.S. Cl. .............................. 706/48; 706/47; 706/45

(58) Field of Classification Search .......................... None
See application file for complete search history.

(56) References Cited

U.S. PATENT DOCUMENTS

| 2004/0034848 | A1* | 2/2004 | Moore et al. | 717/117 |
| 2005/0240546 | A1* | 10/2005 | Barry | 706/47 |
| 2005/0246302 | A1* | 11/2005 | Lorenz et al. | 706/47 |
| 2009/0063385 | A1* | 3/2009 | Proctor | 706/48 |
| 2011/0055137 | A1* | 3/2011 | Proctor et al. | 706/47 |

OTHER PUBLICATIONS

Stolfo et al., S., "The ALEXSYS Mortgage Pool Allocation Expert System: A Case Study of Speeding Up Rule-based Programs", Columbia University, pp. 1-37, Jul. 1990.*

Tirelli, Edson, "Cleaning up the ANTLR DRL grammar," Blog dated May 5, 2007 to May 30, 2007, 18 pages.

Proctor, Mark, "JBoss Drools BRMS Standalone," Blog dated Jul. 5, 2001 to Jul. 30, 2007, 12 pages.

Proctor, Mark, "Drools vs JRules Performance and Future R&D," Blog dated Aug. 1, 2007 to Aug. 31, 2007, 17 pages.

TheServerSide.com, "An Introduction to the Drools Project," May 2004, Copyright 2000-2011.

Tirelli, Edson, "Drools & jBPM, All things Artificial Intelligence related: Rules, Processes, Events, Agents, Planning, Ontologies and more," Blog dated Mar. 1, 2007 to Mar. 27, 2007, Available: http://blog.athico.com/2007_03_01_archive.html, 13 pages.

Proctor, Mark, "Drools & jBPM, All things Artificial Intelligence related: Rules, Processes, Events, Agents, Planning, Ontologies and more," Blog dated Jan. 27, 2007, Available: http://blog.athico.com/2007_01_01_archive.html, 9 pages.

Proctor, Mark, "Drools & jBPM, All things Artificial Intelligence related: Rules, Processes, Events, Agents, Planning, Ontologies and more," Blog dated Feb. 7, 2007 to Feb. 19, 2007, Available:.http://blog.athico.com/2007_01_01_archive.html, 9 pages.

(Continued)

*Primary Examiner* — Jeffrey A Gaffin
*Assistant Examiner* — Adrian Kennedy
(74) *Attorney, Agent, or Firm* — Lowenstein Sandler PC

(57) ABSTRACT

Some embodiments of a sequential mode in a Rete rule engine have been presented. In one embodiment, a Rete rule engine is configured to enter into a sequential mode. Using the Rete rule engine configured, a rule set having a set of rules is evaluated against a set of data objects in a stateless manner.

25 Claims, 6 Drawing Sheets

OTHER PUBLICATIONS

Proctor, Mark, "Drools & jBPM, All things Artificial Intelligence related: Rules, Processes, Events, Agents, Planning, Ontologies and more," Blog dated Jun. 2, 2006 to Dec. 11, 2006, Available: http://blog.athico.com/search?updated-min=2006-01-01T00%3A00%3A00Z&updated-max=2007-01-01T00%3A00%3A00Z&max-results=19 , 22 pages.

Drools Introduction and General User Guide, 3 Chapters, 69 pages.

Proctor, Mark, et al., Drools, Drools Documentation 4.0.7, Available: http://downloads.jboss.com/drools/docs/4.0.7.19894.GA/html_single/index.html 194 pages.

Proctor, Mark, JBoss Rules, Change the Rules of the Game, Blog dated Jun. 1, 2001 to Jun. 29, 2007, Available: http://blog.athico.com/2007_06_01_archive.html, 44 pages.

* cited by examiner

SEQUENTIAL MODE IN A RETE RULE ENGINE

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine processes information by applying rules to data objects (also known as facts). A rule is a logical construct for describing the operations, definitions, conditions, and/or constraints that apply to some predetermined data to achieve a goal. Various types of rule engines have been developed to evaluate and process rules. One conventional type of rule engines is Rete rule engines. A Rete rule engine implements a Rete network to process rules and data objects, such as the example shown in FIG. 1. A Rete network includes many different types of nodes, including, for example, ObjectType Nodes, Alpha Nodes, LeftInputAdapter Nodes, Eval Nodes, Rete Nodes, Join Nodes, Not Nodes, and Terminal Nodes. Referring to FIG. 1, the Rete network 100 includes two ObjectType Nodes 111 and 121, two Alpha Nodes 113 and 123, a LeftInputAdapter Node 115, a Join Node 130, and a Terminal Node 140.

Data objects enter a Rete network at the root node, from which they are propagated to any matching ObjectType Nodes. From a ObjectType Node, a data object is propagated to either an Alpha Node (if there is a literal constraint), a LeftInputAdapter Node (if the data object is the left most object type for the rule), or a Beta Node. For example, referring to FIG. 1, a data object 101 is propagated to a matching ObjectType Node 111. From the ObjectType Node 111, the data object 101 is propagated to an Alpha Node 113, and then to a LeftInputAdapter Node 115. Connected to the LeftInputAdapter Node 115 is a Join Node 130, which is an example of a Beta Node.

A Beta Node has two inputs, unlike one-input nodes, such as ObjectType Nodes and AlphaNodes. A Beta Node can receive Tuples in its left-input and Objects in its right-input. Join Node, Not Node, and Exists Node are some examples of Beta Nodes. All nodes may have memory to store a reference to the Objects and Tuples propagated to them, if any. The LeftInputAdapter Node creates a Tuple with a single Object and propagates the Tuple created to the left-input of the first Beta Node connected to the LeftInputAdapter Node, where the Tuple is placed in the left-input memory of the Beta Node and then join attempts are made with all the Objects on the right-input side. For example, the LeftInputAdapter Node 115 creates a Tuple from the data object 101 and propagates the Tuple to the Join Node 130.

When an Object enters the right-input of a Beta Node, the Object is placed in the right-input memory and join attempts are made with all the Tuples in the left-input memory. If a join attempt is successful, the Object is added to the Tuple and then propagated to the left-input of the next node until the Tuple reaches a Terminal Node. The Tuples stored in the left-inputs are partially matched. When the Tuple reaches the Terminal Node, the Tuple is fully matched. For example, if the Tuple 103 in FIG. 1 successfully joins with an object from the right input of the Join Node 130, then the Tuple 103 is propagated to the Terminal Node 140. At a Terminal Node, an activation is created from the fully matched Tuple and the corresponding Rule. The activation is placed onto an Agenda of the Rete rule engine for potential firing or potential execution.

Since there may be multiple activations in the Agenda, the Agenda typically include a conflict resolution mechanism (e.g., a priority queue) to determine the order in which the activations have to be fired. Conventionally, the Rete rule engine uses a lot of memory in order to store the Objects and the Tuples as the Objects and the Tuples propagate through the Rete network. However, for stateless applications, in which the rules and the data objects remain unchanged after the initial assertion, much of the memory used by the Rete rule engine may be unnecessary and the complex conflict resolution mechanism further lowers the efficiency of the Rete rule engine.

Furthermore, exploiting multiple threads for conventional Rete rule engine is hard, as it is hard to predict when and if a Tuple is going to enter the left-input or an Object is going to enter the right-input of a node. Reads and writes can happen simultaneously. One existing technique to solve the above problem is to add locks to control when reads and writes may occur. But adding locks is expensive and past research has shown the cost of adding locks is more than the cost of using lock free single thread approach.

BRIEF DESCRIPTION OF THE DRAWINGS

The present invention is illustrated by way of example, and not by way of limitation, in the figures of the accompanying drawings and in which.

DETAILED DESCRIPTION

Figure 1:
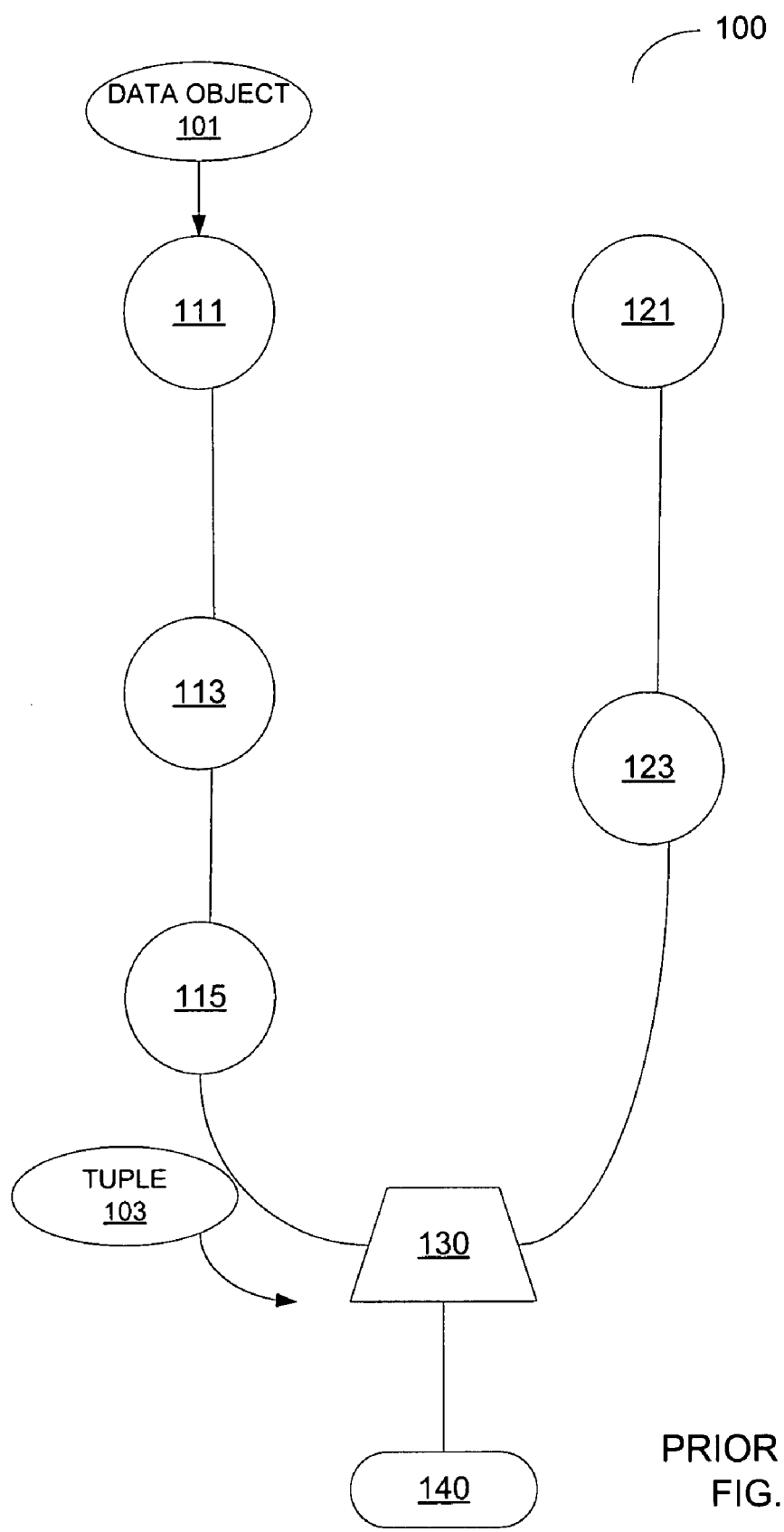
FIG. 1 illustrates a conventional Rete network.

Described herein are some embodiments of a sequential mode in a Rete rule engine. In one embodiment, a Rete rule engine is configured to enter into a sequential mode. Using the Rete rule engine configured, rules in a rule set are evaluated against a set of data objects in a stateless manner. More details of some embodiments of the rule engine are described below.

In the following description, numerous details are set forth. It will be apparent, however, to one skilled in the art, that the present invention may be practiced without these specific details. In some instances, well-known structures and devices are shown block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

A Rete rule engine may support a stateful session and/or a stateless session. In a stateful session, objects can be asserted and modified over time, and rules can also be added and removed. In contrast, in a stateless session, no more data can be asserted or modified and rules cannot be added or removed after the initial data set. In other words, there is no rule re-evaluations in a stateless session. To improve the efficiency of the Rete rule engine in stateless sessions, a Rete rule engine may be configured in the sequential mode as discussed below.

Figure 2:
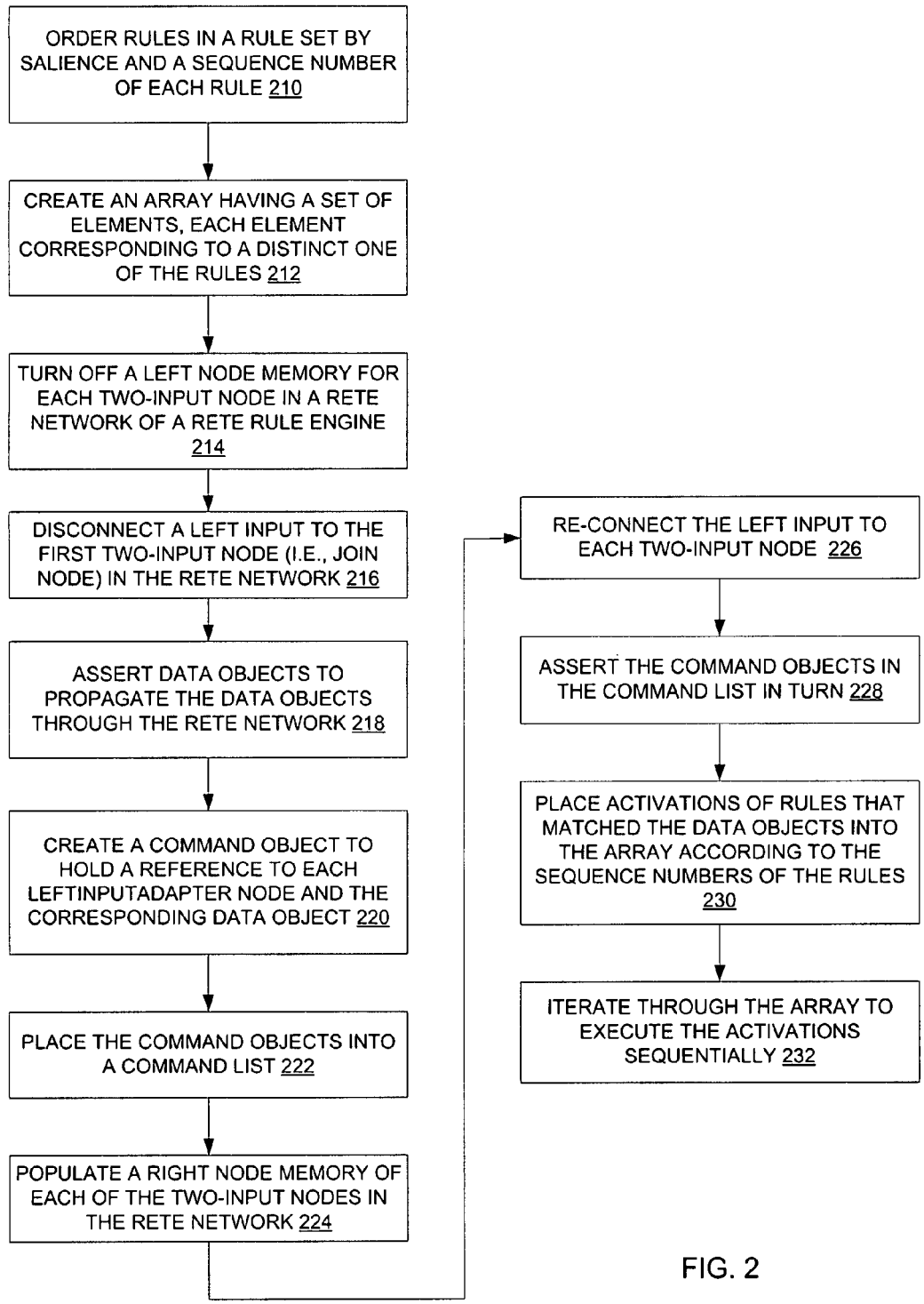
FIG. 2 illustrates one embodiment of a process to configure and execute a Rete rule engine in a sequential mode.

FIG. 2 illustrates one embodiment of a process to configure and execute a Rete rule engine in a sequential mode. The process may be performed by processing logic that may comprise hardware (e.g., circuitry, dedicated logic, programmable logic, microcode, etc.), software (such as instructions run on a processing device), firmware, or a combination thereof. For example, the computer system 700 in FIG. 7 may perform at least part of the process in some embodiments.

Referring to FIG. 2, processing logic orders rules in a rule set by salience and a sequence number of each rule in the rule set (processing block 210). Salience of a rule is a property indicating the priority of the rule among the rules in the rule set. In addition to salience, each rule in the rule set may have been assigned a sequence number. For example, a user of the Rete rule engine may have assigned sequence numbers to the rules in the rule set before inputting the rule set to the Rete rule engine. Such assignment may be based on particular criteria (e.g., conventional practice in the relevant trade) or in random. Then processing logic creates an array having a set of elements (processing block 212). Each of the set of elements corresponds to a distinct one of the rules in the rule set. The array may also be referred to as a sequential array.

In some embodiments, the Rete rule engine implements a Rete network to evaluate the rules and match the rules with data objects, which are also referred to as facts. As mentioned above, the Rete network may include one or more two-input nodes, such as a Join Node. Each two-input nodes includes a left node memory and a right node memory. To configure the Rete rule engine into the sequential mode, processing logic turns off a left node memory for each two-input node in the Rete network (processing block 214). Furthermore, processing logic logically disconnects a left tuple input (also simply referred to as a left input) to a first join node in the Rete network (processing block 216). In other words, the LeftInputAdapter node is disconnected from the first join node's left tuple input. By disconnecting the left input of the first join node, all objects may be propagated first, and thus negating the need to store the left memory. Hence, processing logic may turn off the left memory of all nodes to reduce the amount of memory used by the Rete rule engine. After configuring the Rete rule engine into the sequential mode, processing logic may use the Rete rule engine to efficiently apply the rules onto a set of data objects in a stateless manner.

In some embodiments, processing logic asserts the data objects to propagate the data objects through the Rete network (processing block 218). In general, the right node memories of the nodes in the Rete network may include hash maps for fast retraction of data object. However, since the Rete rule engine is configured to handle stateless sessions, there will be no retraction of data objects. Thus, a list may be used when the values of the data objects are not indexed. For a large number of objects, indexed hash maps may improve performance. But if an object type has a small number of instances, then indexing is probably not of an advantage in terms of efficiency and an object list may be used instead.

In some embodiments, processing logic further creates a command object to hold a reference to each LeftInputAdapter Node and the corresponding data object (processing block 220). Then processing logic places the command object created into a command list (processing block 222). This stops any left-input propagations at assertion time because the left input of the first join node has been disconnected in processing block 216. A right-input propagation will not have to attempt a join with the left-inputs. Therefore, the left node memory may not be needed. To save memory, all nodes may have their left-input Tuple memory turned off, leaving only the right-input object memory on. In other words, the only part of a node that remembers an assertion propagation is the right-input object memory. In addition to saving memory, the above approach increases performance as well because the processor (a.k.a. the central processing unit (CPU)) cycles used to add the tuple to the left storage (e.g., a hash map), if implemented, are not executed. Further, processing logic populates a right node memory of each of the two-input nodes in the Rete network (processing block 224).

After the right node memories of the two-input nodes of the Rete network have been populated, processing logic re-connects the left input to the first join node and asserts the data objects in the command list (processing block 226). Then processing logic asserts the command objects in the command list (processing block 228). Processing logic may go through the command list sequentially, following a first-in-first-out approach.

Rules that have been fully matched through the Rete network result in activations. Processing logic places the activations into the array created in processing block 212 according to the sequence numbers of the corresponding rules (processing block 230). Finally, processing logic iterates through the array to execute (also referred to as "to fire") the activations in the array sequentially (processing block 232). If the user knows the number of rules that will fire, the user may set a "fire limit," where once the specified number of activations is reached, processing logic may exit any further network evaluation and start firing rules. In some alternative embodiments, if the user specifies just one for the fire limit, then processing logic knows that only the first activation can be fired as it is created and then processing logic returns. Thus, there is no need to store anything in the array. Users may also select to just fire activations as the activations appear, and thus, no storage in the array is needed. Furthermore, there will be no user defined sequential execution under such circumstances because the order of firing execution cannot be determined without the use of the array.

Note that as the activations are put into the array and then fired sequentially from the array. Thus, the Rete rule engine may not need an agenda. In some embodiments, each Terminal Node in the Rete network is assigned a sequence number based on the salience and the corresponding Rule's order of being added to the Rete network. Then processing logic may place activations generated in the Terminal Nodes into the array according to the sequence numbers of the Terminal Nodes. Once all command objects have been processed through the Rete network, processing logic may iterate through the array to check each element within the array in turn and may fire the activations sequentially if there are any in the array. To further improve the performance of the Rete rule engine, processing logic may record the first and the last populated elements within the array.

If there is a huge number of rules, an indexed paged direct address table may be used in place of the array that holds the resulting activations. Pages of arrays may be created with index points to the pages. The index points may be set at regular points in the range of pages. The page may indicate if any of its elements are populated or not, thus allowing processing logic to skip iterations of those elements on the page if the indication is negative.

In stateful sessions, a Rete network can have nodes added and removed, and thus, to increase node sharing, an Alpha Node is added per literal constraint. However, in stateless sessions, no more rules may be added after initial setting, and thus, shared nodes in a Rete network may be collapsed into a single evaluation. For instance, if a Rete network has a chain of three Alpha Nodes A, B, and C, where A and B are shared and C is not shared. A and B may be collapsed into a single node and code may be generated to do multiple evaluations natively. Node ordering can be changed to increase sharing and thus, increasing the impact of collapsing nodes.

As mentioned above, it is generally difficult to exploit multiple threads on Rete rule engines because reads and writes may happen simultaneously. However with the sequential approach disclosed herein, the reads and writes may always happen at different times. In some embodiments, all writes happen during the first stage where the objects are propagated to the right input nodes, while all reads happen during Tuple propagation from the LeftInputAdapterNode. As such, each state may be processed on one of a number of parallel threads using concurrent collection structures. Only the synchronisation of the two stages, i.e., knowing when all the object propagations are finished and knowing when all the Tuple propagations are finished, have to be handled in some embodiments.

In some embodiments, the Rete rule engine configured in the sequential mode is used to process mortgage applications. A lender may have predefined a set of business rules (e.g., age>18, monthly income>2×monthly mortgage payment, loan amount<80% of subject property value, etc.), which are input to the Rete rule engine. Information of an applicant and the subject property may be input to the Rete rule engine as a set of data objects (e.g., person, assets, income, appraised value of the subject property, etc.). Since the information of the applicant and the subject property typically does not change after initial submission of the data objects, the data objects may be processed by the Rete rule engine in a stateless manner. Thus, the Rete rule engine may be configured into the sequential mode as discussed above to apply the business rules to the applicant's information.

Figure 3:
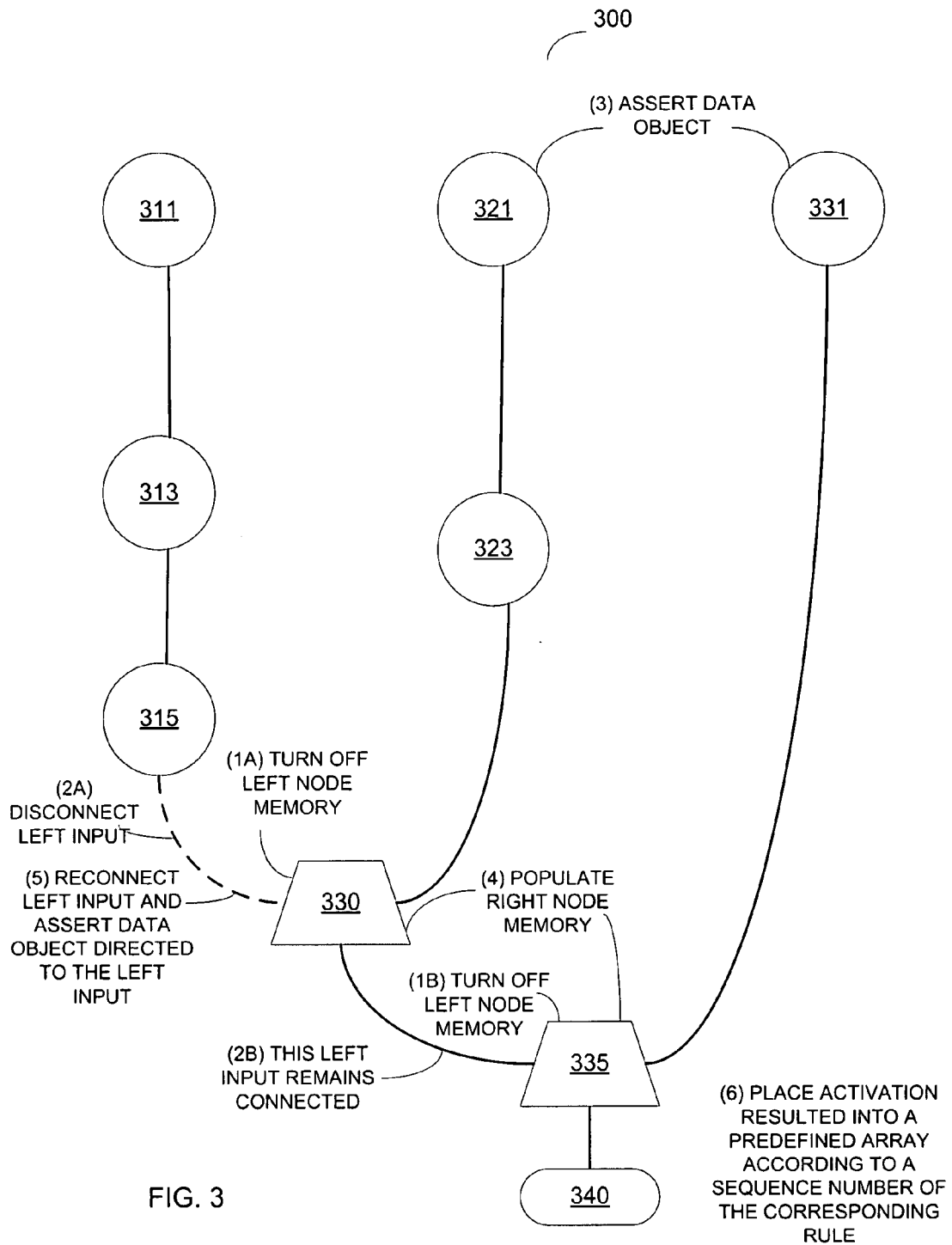
FIG. 3 shows one embodiment of a Rete network implemented by a Rete engine configured in a sequential mode.

To further illustrate the concept of the sequential mode, an exemplary Rete network implemented by a Rete rule engine configured in the sequential mode is shown in FIG. 3. Referring to FIG. 3, the Rete network 300 includes three ObjectTypeNodes 311, 321, and 331, two Alpha Nodes 313 and 323, a LeftInputAdapter Node 315, two Join Nodes 330 and 335, and a Terminal Node 340. Initially, the Rete rule engine turns off the left node memory of the Join Nodes 330 and 335 (1A) and (1B). Furthermore, the Rete rule engine logically disconnects the left input to the first join node, Join Node 330 (2A) without disconnecting the left input to the remaining join node, i.e., Join Node 335 (2B). Then the Rete rule engine asserts the data object at the ObjectTypeNodes 321 and 331 (3). Traversing the Alpha Node 323, the asserted data object from the ObjectTypeNode 321 is input to the right input of the Join Node 330, causing the right node memory of the Join Node 330 to be populated (4). Likewise, the asserted data object from the ObjectTypeNode 331 is input to the right input of the Join Node 335, causing the right node memory of the Join Node 335 to be populated (4).

After the right node memories of the Join Nodes 330 and 335 have been populated, the Rete rule engine re-connects the left input of the Join Node 330 and asserts the data object directed to the left input (5). In the current example, the data object directed to the left input is the one at the ObjectTypeNode 311. In some embodiments, the Rete rule engine may have created a command object having the data object and a reference to the LeftInputAdapter Node 315 into a command list. After the left input has been re-connected, the Rete rule engine checks the command list and asserts each command object in the command list in turn.

If a rule is fully matched upon assertion of the data objects in the Join Node 330, the rule propagates to the next join node, i.e., Join Node 335. Again, if the rule is fully matched at Join Node 335, then the rule propagates to the Terminal Node 340 and results in an activation. The Rete rule engine places the activation resulted into a predefined array according to a sequence number of the corresponding rule (6). Once all command objects in the command list are processed, the Rete rule engine may iterate through the array to check each element in turn and fire the activations in the array sequentially. In some embodiments, the first and the last populated elements in the array are recorded to improve performance. Note that unlike some conventional Rete rule engine, the Rete rule engine no longer needs an agenda in some embodiments.

Instead, the Rete rule engine may use an array to hold activations. The activations placed in the elements (also referred to as cells) of the array according to the sequence numbers of their respective rules. In some embodiments, the Terminal Node 340 is assigned a sequence number based on the salience and its order of being added to the Rete network. The activation from the Terminal Node 340 is placed in an element of the array associated with the sequence number of the Terminal Node 340.

Figure 4:
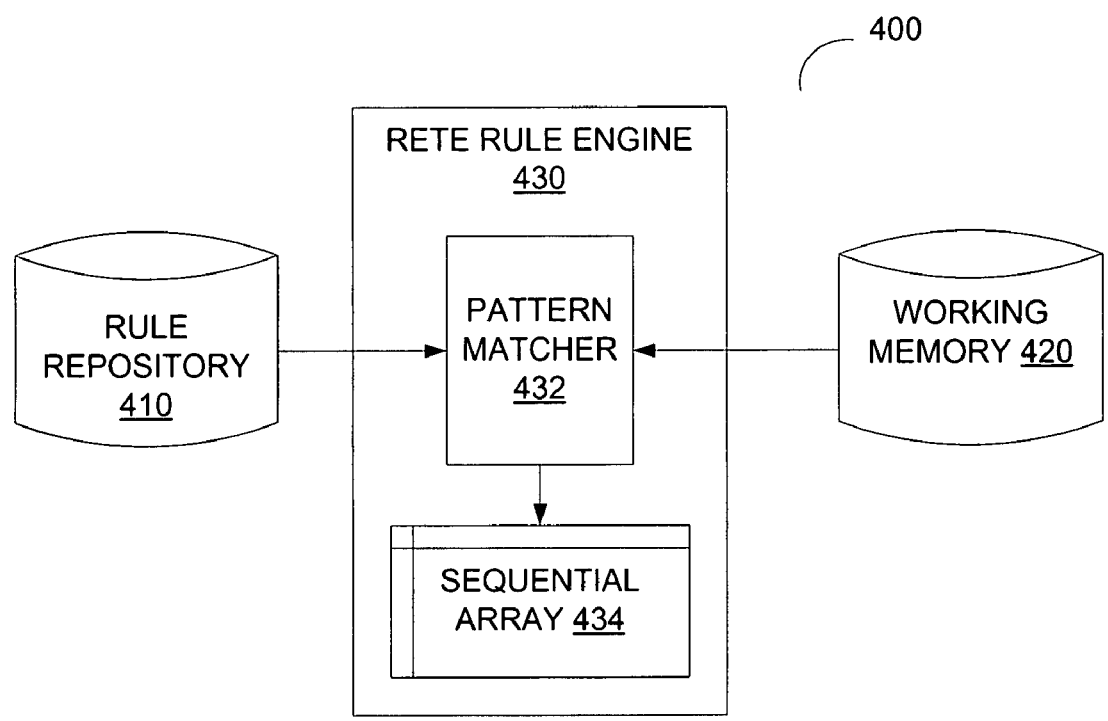
FIG. 4 shows one embodiment of a Rete rule engine configured in a sequential mode.

FIG. 4 shows one embodiment of a Rete rule engine configured in a sequential mode. In some embodiments, a Rete rule engine 430 is operatively coupled to a rule repository 410 and a working memory 420. The rule repository 410 stores a rule set having a number of rules. The rule repository 410 may also be referred to as a production memory. The working memory 420 stores data objects (also referred to as facts) that have been asserted.

In some embodiments, the Rete rule engine 430 includes a pattern matcher 432 and a sequential array 434. The pattern matcher 432 implements a Rete network (such as the Rete network 300 shown in FIG. 3) to evaluate the rules from the rule repository 410 against the data objects from the working memory 420. Details of some embodiment of the evaluation have been discussed above. Fully matched rules result in activations, which are placed into the sequential array 434 according to the sequence numbers of their respective rules. The sequential array 434 (or simply referred to as the array) has a number of elements. Each element is associated with a sequence number of the rules. The Rete rule engine 430 may iterate through the sequential array 434 to execute or fire the activations sequentially. Thus, the element position in the array 434 may indicate the firing order of the activations. If a rule fails to fully matched and thus, no corresponding activation results, then the corresponding element in the array remains empty and the Rete rule engine 430 may ignore this empty element as the Rete rule engine 430 iterates through the array 434.

Figure 5:
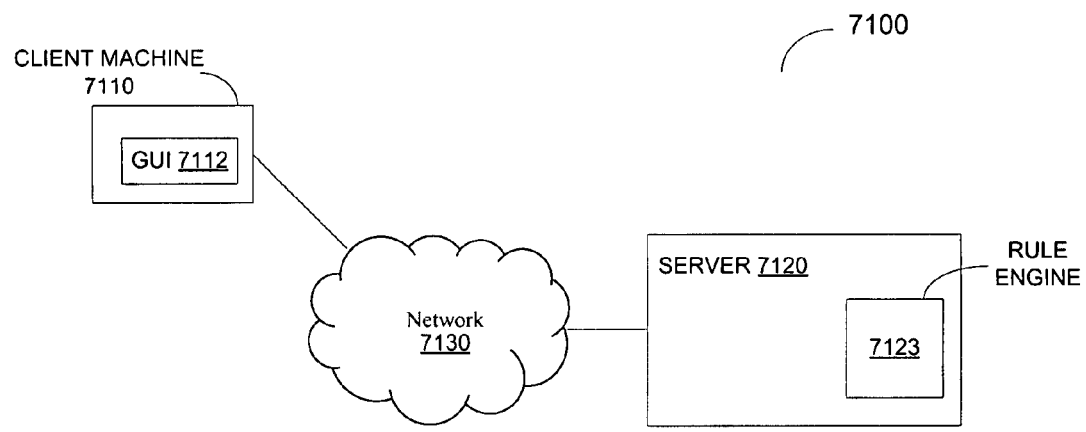
FIG. 5 shows one embodiment of a system usable with some embodiments of the present invention.

FIG. 5 illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a Rete rule engine 7123 having an architecture as illustrated in FIG. 4. The client machine 7110 may present a GUI 7112 (e.g., a web-page rendered by a browser) to allow users to input rule sets and/or data objects, which may be sent to the server 7120 to be processed using the Rete rule engine 7123 as discussed above.

Figure 6:
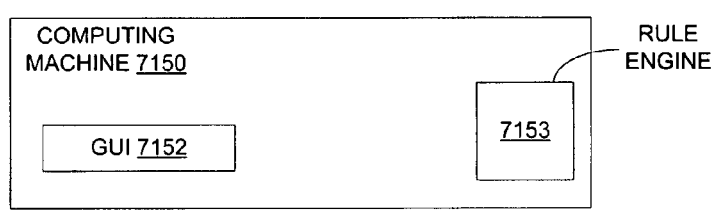
FIG. 6 shows an alternate embodiment of a system usable with some embodiments of the present invention.

FIG. 6 illustrates an alternate embodiment of a system usable with some embodiments of the present invention. The system 7200 includes a computing machine 7150, which may be implemented using the computer system 700 illustrated in FIG. 7. The computing machine 7150 includes a Rete rule engine 7153 and a GUI 7152. In some embodiments, users may input files for rules using the GUI 7152. Then the files may be processed by Rete rule engine 7153 as discussed above.

Figure 7:
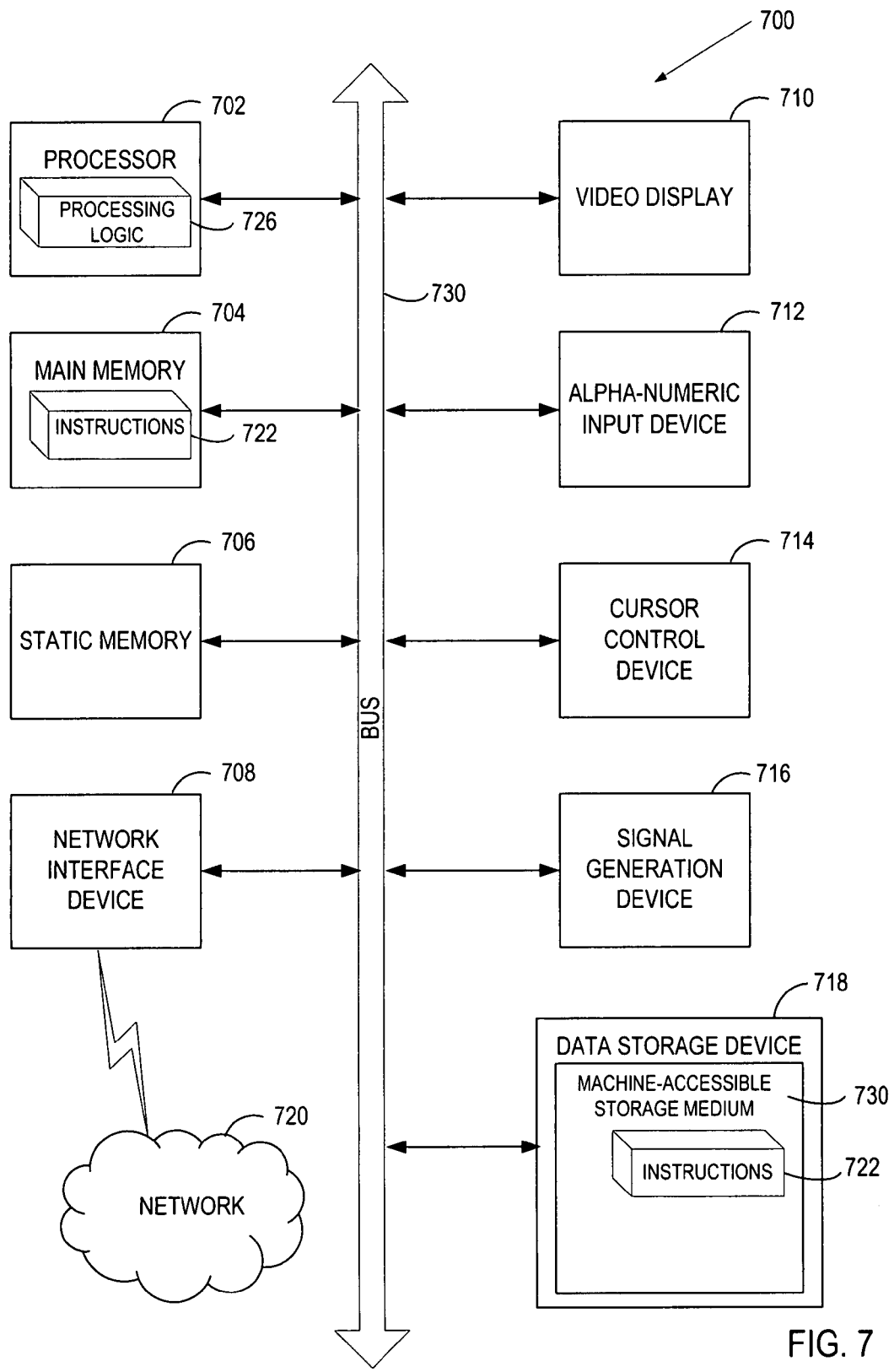
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a machine-readable storage medium) on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a sequential mode of a Rete rule engine have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   configuring a Rete rule engine to enter into a sequential mode; and
   using the configured Rete rule engine to evaluate a rule set having a plurality of rules against a set of data objects in a stateless manner.

2. The method of claim 1, wherein configuring the Rete rule engine comprises:
   ordering the plurality of rules by salience and a sequence number of each of the plurality of rules.

3. The method of claim 1, wherein configuring the Rete rule engine comprises:
   turning off a left node memory for each of a plurality of nodes in a Rete network of the Rete rule engine; and
   disconnecting a left input to a first one of one or more two-input nodes in the Rete network.

4. The method of claim 1, wherein configuring the Rete rule engine comprises:
   creating an array having a plurality of elements, each of the plurality of elements corresponding to a distinct one of the plurality of rules, wherein a position of each of the plurality of elements in the array is indicative of a firing order of a corresponding rule.

5. The method of claim 1, further comprising:
   asserting the set of data objects to populate a right node memory for each of a plurality of nodes in a Rete network of the Rete rule engine when a left node memory of each of the plurality of nodes is turned off.

6. The method of claim 1, further comprising:
   placing into a command list a data object that is directed to a left input of each of one or more two-input nodes in a Rete network of the Rete rule engine; and
   executing data objects in the command list after a right node memory of each of the one or more two-input nodes have been populated.

7. The method of claim 1, further comprising:
   placing into an array one or more activations of one or more of the plurality of rules that have been matched with one or more of the set of data objects according to sequence numbers of the one or more of the plurality of rules; and
   iterating through the array to execute the one or more activations sequentially.

8. The method of claim 1, wherein the plurality of rules comprises a plurality of business rules for determining if an applicant qualifies for a mortgage.

9. An apparatus comprising:
   a production memory to store a rule set having a plurality of rules; and
   a Rete rule engine coupled to the production memory, the Rete rule engine being configurable into a sequential mode, in which the Rete rule engine is operable to evaluate the plurality of rules against a set of data objects in a stateless manner.

10. The apparatus of claim 9, wherein the plurality of rules are ordered by salience and a sequence number of each of the plurality of rules.

11. The apparatus of claim 9, wherein the Rete rule engine is operable to turn off a left node memory for each of a plurality of nodes in a Rete network of the Rete rule engine, and to disconnect a left input to a first one of one or more two-input nodes in the Rete network.

12. The apparatus of claim 9, wherein the Rete rule engine comprises:
   a storage device to store an array having a plurality of elements, each of the plurality of elements corresponding to a distinct one of the plurality of rules, wherein a position of each of the plurality of elements in the array is indicative of a firing order of a corresponding rule.

13. The apparatus of claim 9, further comprising a working memory, wherein the Rete rule engine is operable to assert the set of data objects into the working memory to populate a right node memory for each of a plurality of nodes in a Rete network of the Rete rule engine when a left node memory of each of the plurality of nodes is turned off.

14. The apparatus of claim 9, wherein the Rete rule engine is operable to place into a command list a data object directed to a left input of each of one or more two-input nodes in a Rete network of the Rete rule engine, and to execute data objects in the command list after a right node memory of each of the one or more two-input nodes have been populated.

15. The apparatus of claim 9, wherein the plurality of rules comprises a plurality of business rules for determining if an applicant qualifies for a mortgage.

16. A system comprising the apparatus of claim 9, further comprising:
   a user interface operatively coupled to the production memory to receive the plurality of rules from a user, wherein the plurality of rules comprises a plurality of business rules for determining if an applicant qualifies for a mortgage.

17. A system comprising the apparatus of claim 9, further comprising:
   a server operable to execute the Rete rule engine; and
   a client machine communicatively coupled to the server via a network, the client machine comprising a user interface to receive the plurality of rules from a user and to send the plurality of rules to the server via the network.

18. The non-transitory machine-readable medium that provides instructions that, if executed by a processor, will cause the processor to perform operations comprising:
   configuring a Rete rule engine to enter into a sequential mode; and
   using the configured Rete rule engine to evaluate a rule set having a plurality of rules against a set of data objects in a stateless manner.

19. The machine-readable medium of claim 18, wherein configuring the Rete rule engine comprises:
   ordering the plurality of rules by salience and a sequence number of each of the plurality of rules.

20. The machine-readable medium of claim 18, wherein configuring the Rete rule engine comprises:
   turning off a left node memory for each of a plurality of nodes in a Rete network of the Rete rule engine; and
   disconnecting a left input to a first one of one or more two-input nodes in the Rete network.

21. The machine-readable medium of claim 18, wherein configuring the Rete rule engine comprises:
  creating an array having a plurality of elements, each of the plurality of elements corresponding to a distinct one of the plurality of rules, wherein a position of each of the plurality of elements in the array is indicative of a firing order of a corresponding rule.

22. The machine-readable medium of claim 18, wherein the operations further comprise:
  asserting the set of data objects to populate a right node memory for each of a plurality of nodes in a Rete network of the Rete rule engine when a left node memory of each of the plurality of nodes is turned off.

23. The machine-readable medium of claim 18, wherein the operations further comprise:
  placing into a command list a data object that is directed to a left input of each of one or more two-input nodes in a Rete network of the Rete rule engine; and
  executing data objects in the command list after a right node memory of each of the one or more two-input nodes have been populated.

24. The machine-readable medium of claim 18, wherein the operations further comprise:
  placing into an array one or more activations of one or more of the plurality of rules that have been matched with one or more of the set of data objects according to sequence numbers of the one or more of the plurality of rules; and
  iterating through the array to execute the one or more activations sequentially.

25. The machine-readable medium of claim 18, wherein the plurality of rules comprises a plurality of business rules for determining if an applicant qualifies for a mortgage.

* * * * *